United States Patent [19]
Oishi

[11] Patent Number: 5,708,547
[45] Date of Patent: Jan. 13, 1998

[54] MAGNETIC DISK CARTRIDGE

[75] Inventor: Kengo Oishi, Kanagawa-ken, Japan

[73] Assignees: Fuji Photo Film Co., Ltd., Tokyo, Japan; Iomega Corporation, Roy, Utah

[21] Appl. No.: 699,941

[22] Filed: Aug. 20, 1996

[51] Int. Cl.⁶ ............................... G11B 23/033
[52] U.S. Cl. .................................... 360/133
[58] Field of Search ............................ 360/133

[56] References Cited

FOREIGN PATENT DOCUMENTS 60-20374  2/1985  Japan .................... 360/103

*Primary Examiner*—Robert S. Tupper
*Attorney, Agent, or Firm*—Sughrue, Mion, Zinn, Macpeak & Seas, PLLC

[57] ABSTRACT

A magnetic disk cartridge has a cassette shell formed of a pair of cassette shell halves encasing a rotatable magnetic disk supported by a center core, the inner surface of at least one cassette shell half lying parallel to the magnetic disk is formed with a recess which reduces the wall thickness of a portion of the cassette shell half, the recess is formed with a step at its periphery and with a ring-shaped projection at a location corresponding to that of a flange portion of the center core, a sheet of elastic material having a liner attached to the surface thereof facing the magnetic disk is fixed on the cassette shell half to cover the recess with a peripheral portion thereof fastened to the step and a center portion thereof supported by the ring-shaped projection. The structure reduces the weight of the cassette shell and enhances its productivity and quality.

2 Claims, 3 Drawing Sheets

MAGNETIC DISK CARTRIDGE

BACKGROUND OF THE INVENTION

1. Field of the Invention

The present invention relates to a magnetic disk cartridge, and more particularly, to an improved magnetic disk cartridge having a rotatable magnetic disk encased in a cassette shell.

2. Description of the Related Art

A magnetic disk cartridge comprises a magnetic disk for magnetically recording analog and/or digital signals rotatably encased in a thin cassette shell constituted of a pair of plastic cassette shell halves that are mated and joined together. The cassette shell is formed in the shape of a flat prism (substantially a hexahedron) with an approximately square top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the magnetic disk cartridge is not in use.

Liners made of nonwoven fabric or the like are attached to the inner surfaces of the cassette shell opposite the main surfaces of the magnetic disk for protecting the surfaces of the magnetic disk from scratching as well as for wiping off dust and the like adhering thereto.

In recent years, new high-density recording methods have led to the development of a magnetic disk cartridge with 50 times the capacity of the widely used conventional magnetic disk cartridge (3.5-inch floppy disk). In order to increase the recording density and the data transfer rate of such a high-capacity magnetic disk cartridge, the magnetic disk is rotated at a much faster speed than the conventional one and the magnetic heads used for recording and reproducing signals to/from the magnetic disk are required to be positioned with very high precision.

FIG. 3 is a perspective view of such a high-speed magnetic disk cartridge and FIG. 4 is a sectional view of the same taken along line IV—IV in FIG. 3.

The magnetic disk cartridge, designated by reference numeral 1, has a cassette shell 3 encasing a rotatable magnetic disk 2. The cassette shell 3 is formed of a pair of lower (first) and upper (second) cassette shell halves 4, 5, which are both made of molded plastic. A magnetic head access opening 3a is formed in one side surface of the cassette shell 3 for enabling magnetic reproducing and recording heads to be brought close to the opposite surfaces of the magnetic disk 2 from the exterior, and a sectionally u-shaped shutter member 6 is provided to be slidable along the cassette shell for opening and closing the magnetic head access opening 3a. The shutter member 6 is biased toward the closed position by a spring (not shown). FIG. 3 shows the magnetic head access opening 3a closed by the shutter member 6 (in the closed position).

The first cassette shell half 4, located on the lower side in the figures, is formed with an opening (circular hole) 4a through which a center core 7 supporting the center of the magnetic disk 2 is exposed. A doughnut-shaped liner 8 made of nonwoven fabric and having a circular hole 8a of slightly larger diameter than the circular hole 4a is attached to the inner surface 4b of the first cassette shell half 4 by ultrasonic welding or the like. A doughnut-shaped liner 9 made of nonwoven fabric and having a circular hole 9a for avoiding interference with a flange portion 7a of the center core 7 is attached to the inner surface of the second cassette shell half 5 located on the upper side in the figures. The attachment method is similar to that of the liner 8.

The magnetic head access opening 3a provided in one side surface of the cassette shell 3 of the so-configured magnetic disk cartridge 1 is formed to a size allowing access to both surfaces of the magnetic disk 2 from the exterior. Magnetic heads for recording and reproducing are inserted through the magnetic head access opening 3a and brought near the rapidly rotating magnetic disk 2 to record/reproduce signals. The cassette shell 3 therefore has to be made to a thickness enabling insertion of the magnetic heads.

On the other hand, since the magnetic disk 2 rapidly rotated inside the cassette shell 3 is made of a flexible material, it has to be prevented from flopping during rotation and the space inside the cassette shell 3 has to be precisely formed to suitable dimensions (generally to a thickness equal to that of the magnetic disk and the liners 8, 9 plus some amount of clearance). The required size can be achieved with high precision only if the cassette shell 3 has sufficient rigidity, while sufficient rigidity can be obtained only if the cassette shell 3 has sufficient thickness. The thickness of the cassette shell 3 therefore has to be made twice or more than that of the conventional 3.5-inch floppy disk having a thickness of about 3 mm. Accordingly, the wall thickness of the pair of cassette shell halves 4, 5 mated and joined to form the conventional cassette shell 3 have also required fairly large thickness.

However, a cassette shell 3 with such a thick-walled structure has the drawbacks of being heavy and high in production cost owing to the large amount of material and long molding time required. Moreover, deformations known as sink marks are liable to occur in the thick-wall portions and give rise to degraded dimensional precision and poor appearance. These are quality problems that cannot be ignored.

SUMMARY OF THE INVENTION

This invention was accomplished in light of the these circumstances and has as its object to provide a magnetic disk cartridge of the foregoing type having a cassette shell of reduced weight and improved productivity and quality.

For achieving this object, this invention provides a magnetic disk cartridge wherein at least one of the pair of cassette shell halves is formed with a recess in an inner surface lying parallel to the magnetic disk thereby reducing the wall thickness of a portion of the cassette shell, the recess is formed with a step at its periphery and with a ring-shaped projection at a location corresponding to that of the flange portion of the center core, and a sheet of elastic material having a liner attached to its surface facing the magnetic disk is fixed on the cassette shell half to cover the recess with the peripheral portion thereof fastened to the step and the center portion thereof supported by the ring-shaped projection.

The surface of the step of the recess to which the elastic sheet is attached and the surface of the ring-shaped projection supporting the elastic sheet are preferably formed in a plane approximately parallel to the magnetic disk and the elastic sheet is preferably fixed on the cassette shell half to lie approximately parallel to the magnetic disk.

DESCRIPTION OF THE PREFERRED EMBODIMENT

An embodiment of the magnetic disk cartridge according to the present invention will hereinbelow be described with reference to the accompanying drawings.

Figure 1:
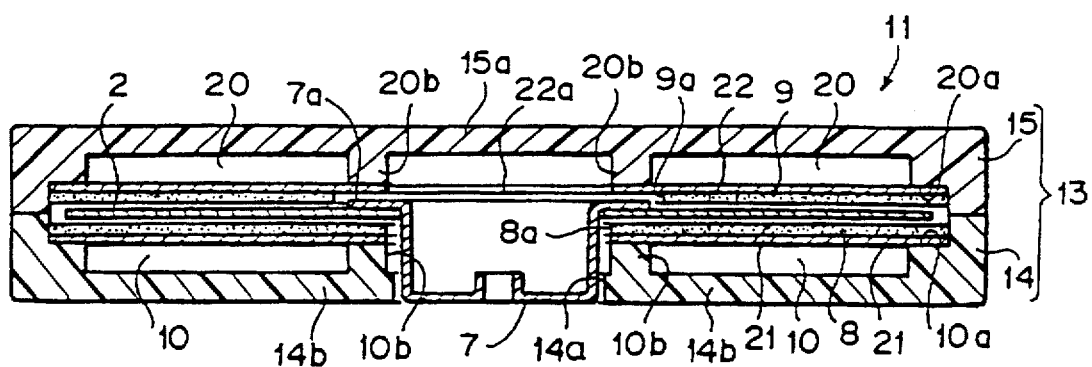
FIG. 1 is a sectional view of a magnetic disk cartridge that is an embodiment of the invention.
Figure 2:
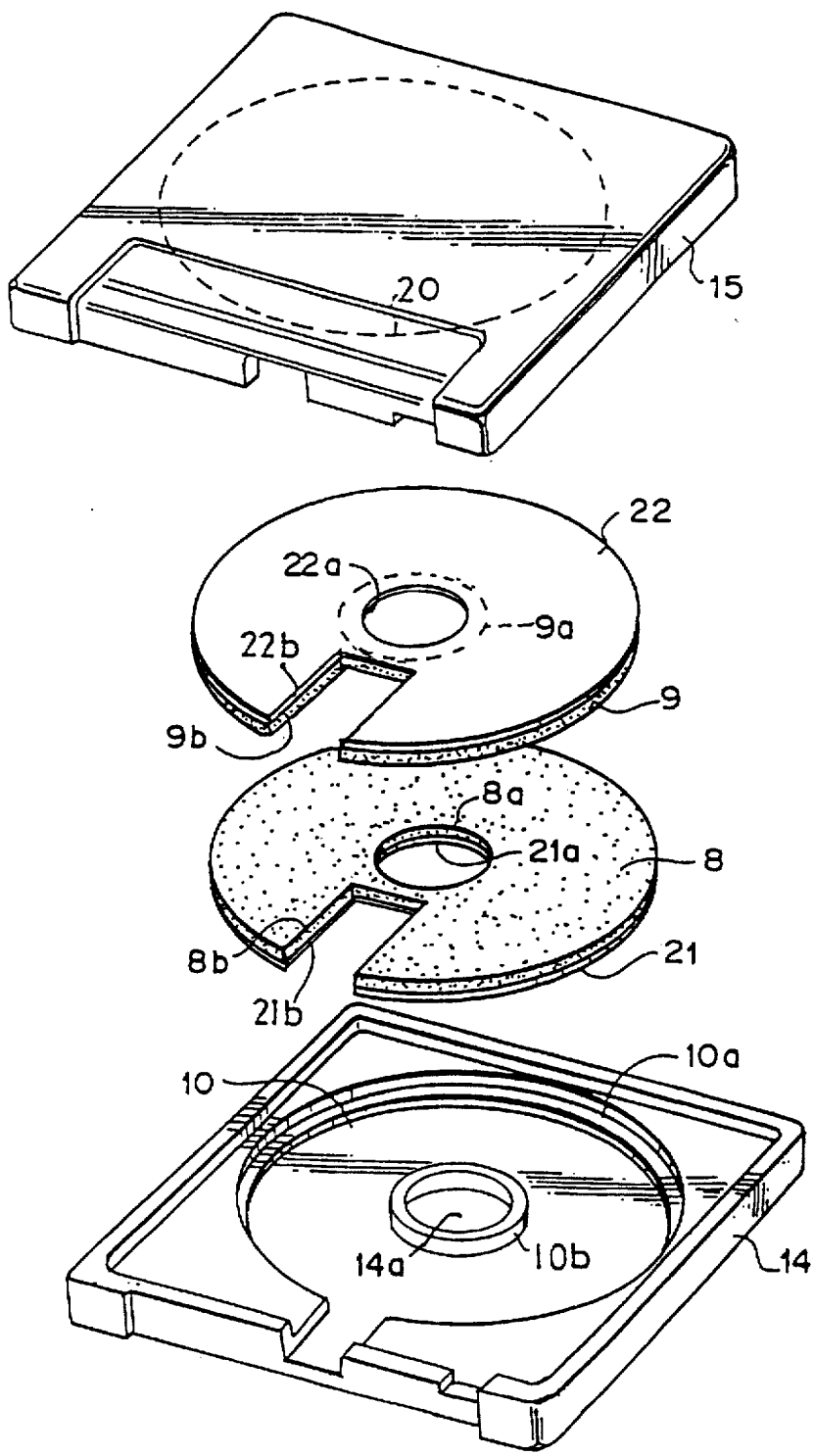
FIG. 2 is an exploded perspective view of the a magnetic disk cartridge of FIG. 1 with the magnetic disk omitted.
Figure 3:
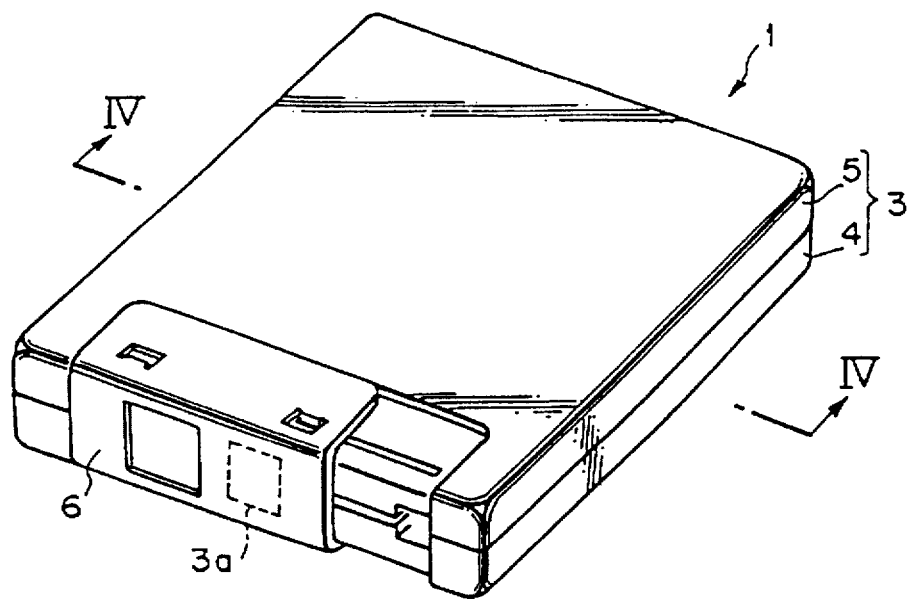
FIG. 3 is a perspective view of a prior art magnetic disk cartridge.
Figure 4:
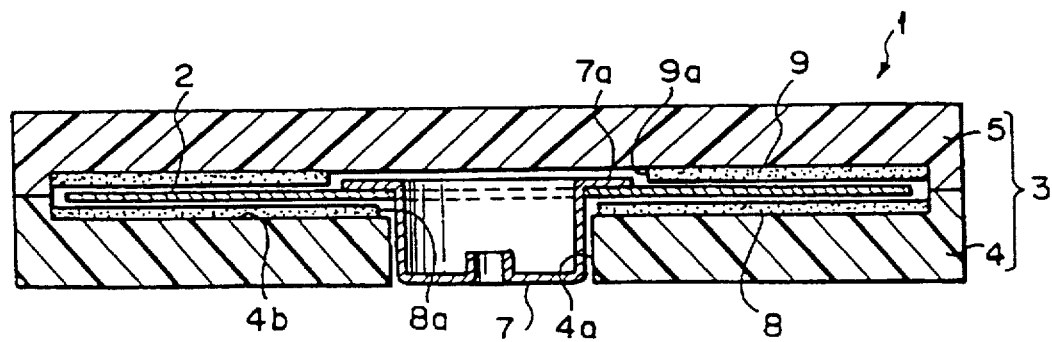
FIG. 4 is a sectional view taken along line IV—IV in FIG. 3.

FIGS. 1 and 2 show a magnetic disk cartridge that is an embodiment of the invention. FIG. 1 is a sectional view similar to FIG. 4 and FIG. 2 is an exploded perspective view with the magnetic disk omitted.

The magnetic disk cartridge, designated by reference numeral 11, has a cassette shell 13 encasing a rotatable magnetic disk 2. Like the cassette shell 3 of FIG. 4, the cassette shell 13 is formed of a pair of lower (first) and upper (second) cassette shell halves 14, 15, which are both made of molded plastic.

The first cassette shell half 14, located on the lower side in the figures, is formed with a circular hole 14a through which a center core 7 supporting the center of the magnetic disk 2 is exposed. The inner surface of the first cassette shell half 14 is formed with a circular recess 10 concentric with the circular hole 14a. The center portion of the first cassette shell half 14 forming the floor of the recess 10 is a thin-wall portion 14b.

The periphery of the recess 10 is formed thereabout with a step 10a and the center portion of the recess 10 is formed with a ring-shaped projection 10b at a location corresponding to that of a flange portion 7a of the center core 7.

The recess 10 is covered with a thin elastic sheet 21 of metal, plastic or the like in the manner of a ceiling. The peripheral portion of the elastic sheet 21 rests on the step 10a and the center portion thereof is supported by the upper surface of the ring-shaped projection 10b. The peripheral portion is attached to the first cassette shell half 14. The elastic sheet 21 is formed with a circular hole 21a for avoiding contact with the center core 7 and with a notch 21b for enabling insertion of a magnetic head. A liner 8 made of nonwoven fabric or the like is attached to the upper surface of the elastic sheet 21, i.e., the surface facing the magnetic disk 2. The liner 8 is formed with a circular hole 8a and a notch 8b congruous with the circular hole 21a and the notch 21b of the elastic sheet 21. The liner 8 is maintained in contact with the magnetic disk 2 by the springiness of the elastic sheet 21.

The inner surface of the second cassette shell half 15, located on the upper side in the figures, is formed with a circular recess 20 of approximately the same diameter as the recess 10. The center portion of the second cassette shell half 15 forming the ceiling of the recess 20 is a thin-wall portion 15a. The periphery of the recess 20 is formed thereabout with a step 20a and the center portion of the recess 20 is formed with a ring-shaped projection 20b at a location corresponding to that of the flange portion 7a of the center core 7.

The recess 20 is covered with a thin elastic sheet 22 of metal, plastic or the like in the manner of a floor. The peripheral portion of the elastic sheet 22 rests on the step 20a and the center portion thereof is supported by the lower surface of the ring-shaped projection 20b. The peripheral portion of the elastic sheet 22 is attached to the second cassette shell half 15. A liner 9 is attached to the lower surface of the elastic sheet 22, i.e., the surface facing the magnetic disk 2. The liner 9 is formed with a circular hole 9a to avoid interference with the flange portion 7a of the center core 7 and a notch 9b for enabling insertion of a magnetic head. The liner 9 is maintained in contact with the magnetic disk 2 by the springiness of the elastic sheet 22.

The elastic sheet 22 is formed with a circular hole 22a and a notch 22b congruous with the circular hole 9a and the notch 9b of the liner 9. The region of the first cassette shell half 14 between the magnetic head access opening at the side surface and the recess 10 is also formed as a thin-wall portion to ensure smooth insertion of a magnetic head.

The upper surface of the ring-shaped projection 10b on the first cassette shell half 14 (the supporting surface of the elastic sheet 21) is formed as a flat surface of about the same height as the step 10a to which the peripheral portion of the elastic sheet 21 is attached. The upper surface of the ring-shaped projection 10b supports the elastic sheet 21 at the portion surrounding the circular hole 21a so as to hold the elastic sheet 21 approximately parallel to the magnetic disk 2. Similarly, lower surface of the ring-shaped projection 20b on the second cassette shell half 15 (the supporting surface of the elastic sheet 22) is formed as a flat surface of about the same height as the step 20a to which the peripheral portion of the elastic sheet 22 is attached. The lower surface of the ring-shaped projection 20b supports the region of the elastic sheet 22 facing the flange portion 7a of the center core 7 so as to hold the elastic sheet 22 approximately parallel to the magnetic disk 2.

Since in this embodiment the inner surfaces of the cassette shell halves 14, 15 are formed with the recesses 10, 20 so as to reduce the wall thickness of the cassette shell halves 14, 15, the cassette shell 13 can be reduced in weight, enhanced in productivity owing to the shorter molding time required, and reduced in production cost. In addition, the prescribed interior dimensions of the cassette shell 13 can be maintained with high precision. While it is also possible to form a recess in only one of the two cassette shell halves 14, 15, recesses are preferably formed in both cassette shell halves 14, 15 as in the embodiment described.

The elastic sheets 21, 22 having the liners 8, 9 attached to their surfaces ensure good contact of the liners 8, 9 with the magnetic disk 2 and, as such, enhance the magnetic disk 2 surface cleaning effect of the liners 8, 9.

In addition, the ring-shaped projections 10b, 20b provided for supporting the center portions of the elastic sheets 21, 22 prevent unnecessary deformation of the elastic sheets 21, 22, fix the elastic sheets 21, 22 to the cassette shell so as to lie approximately parallel to the magnetic disk 2, and ensure good contact of the liners 8, 9 with the magnetic disk 2.

The recesses 10, 20 and the elastic sheets 21, 22 are not limited to circular shape but may instead be rectangular in planar configuration. The attachment of the liners 8, 9 to the elastic sheets 21, 22 can be achieved by any of various methods such as by ultrasonic welding, use of an adhesive, or use of a bonding agent or UV curable agent.

Since the magnetic disk cartridge according to this invention has the inner surfaces of its cassette shell halves formed with the recesses so as to reduce the cassette shell wall thickness, the cassette shell can be reduced in weight, enhanced in productivity owing to the shorter molding time required, and reduced in production cost. Moreover, the prescribed interior dimensions of the cassette shell can be maintained with high precision.

Since the liners are attached to the elastic sheets, they are maintained in elastic contact with the surfaces of the magnetic disk, which enhances their magnetic disk surface cleaning effect.

In addition, the ring-shaped projections which support the center portions of the elastic sheets prevent unnecessary deformation of the elastic sheets, fix the elastic sheets to the cassette shell so as to lie approximately parallel to the magnetic disk, and ensure good contact of the liners with the magnetic disk.

What is claimed is:

1. A magnetic disk cartridge comprising:

a magnetic disk, a center core supporting the center of the magnetic disk, a cassette shell encasing the magnetic disk to be rotatable therein and being formed in one side surface with a magnetic head access opening, the cassette shell including a first cassette shell half formed with an open portion through which the center core is exposed and a second cassette shell half mating with the first cassette shell half, wherein an inner surface of at least one cassette shell half lying parallel to the magnetic disk is formed with an annular recess which reduces a wall thickness of a portion of the at least one cassette shell half, the annular recess is formed with a step at its outer periphery and with a ring-shaped projection at a location corresponding to that of a flange portion of the center core, and a sheet of elastic material having a liner attached to a surface facing the magnetic disk is fixed on the at least one cassette shell half to cover the annular recess with a peripheral portion thereof fastened to the step and a center portion thereof supported by the ring-shaped projection.

2. The magnetic disk cartridge as defined in claim 1, wherein a surface of the step of the annular recess to which the elastic sheet is attached and a surface of the ring-shaped projection supporting the elastic sheet are formed in a plane approximately parallel to the magnetic disk and the elastic sheet is fixed on the at least one cassette shell half to lie approximately parallel to the magnetic disk.

* * * * *